United States Patent
Matsushima

(10) Patent No.: US 8,887,859 B2
(45) Date of Patent: Nov. 18, 2014

(54) BRAKE PIPE STRUCTURE OF MOTORCYCLE

(71) Applicant: Suzuki Motor Corporation, Hamamatsu (JP)

(72) Inventor: Yohei Matsushima, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 18 days.

(21) Appl. No.: 13/716,830

(22) Filed: Dec. 17, 2012

(65) Prior Publication Data

US 2013/0180605 A1    Jul. 18, 2013

(30) Foreign Application Priority Data

Dec. 16, 2011  (JP) ................ 2011-275658

(51) Int. Cl.
| | | |
|---|---|---|
| *B62K 19/30* | (2006.01) | |
| *B62L 3/02* | (2006.01) | |
| *B62K 19/38* | (2006.01) | |
| *B60T 17/04* | (2006.01) | |
| *B60T 7/10* | (2006.01) | |
| *B60T 8/36* | (2006.01) | |

(52) U.S. Cl.
CPC ............ *B60T 17/043* (2013.01); *B62L 3/023* (2013.01); *B62K 19/38* (2013.01); *B60T 17/04* (2013.01); *B60T 7/10* (2013.01); *B60T 8/3685* (2013.01)
USPC ......................................... 180/312; 180/219

(58) Field of Classification Search
USPC ........ 303/9.61, 9.64, 137; 180/232, 291, 311, 180/312, 219
See application file for complete search history.

(56) References Cited

U.S. PATENT DOCUMENTS

| | | | | |
|---|---|---|---|---|
| 4,660,683 A | * | 4/1987 | Hayashi et al. | 188/18 A |
| 7,350,881 B2 | * | 4/2008 | Asahi | 303/137 |
| 7,918,301 B2 | * | 4/2011 | Ito et al. | 180/219 |
| 2005/0082821 A1 | | 4/2005 | Fujita et al. | |
| 2012/0032500 A1 | | 2/2012 | Tamura | |
| 2012/0186895 A1 | * | 7/2012 | Hamauzu et al. | 180/312 |

FOREIGN PATENT DOCUMENTS

| | | |
|---|---|---|
| EP | 1 514 790 | 3/2005 |
| EP | 2415647 A2 | 2/2012 |
| JP | 59114153 A | 7/1984 |
| JP | 2007076554 A | 3/2007 |
| JP | 2010-052526 | 3/2010 |
| WO | 2011/025043 A1 | 3/2011 |

OTHER PUBLICATIONS

European Search Report, dated Apr. 15, 2013, which issued during the prosecution of European Patent Application No. 12191570.6, which corresponds to the present application.
Chinese First Office Action dated Jul. 22, 2014, which issued during prosecution of Chinese Patent Application No. 201210530227.8, which corresponds to the present application.

* cited by examiner

*Primary Examiner* — Christopher Schwartz
(74) *Attorney, Agent, or Firm* — Troutman Sanders LLP

(57) ABSTRACT

A brake pipe structure of a motorcycle includes: a first brake pipe connecting a master cylinder and an ABS unit; and a second brake pipe connecting the ABS unit and a hydraulic wheel braking part. The first brake pipe and the second brake pipe are suspended and held between a front fork and a body frame so as to pass near a center axis of a steering shaft under a head pipe.

4 Claims, 7 Drawing Sheets

BRAKE PIPE STRUCTURE OF MOTORCYCLE

CROSS-REFERENCE TO RELATED APPLICATIONS

This application is based upon and claims the benefit of priority of the prior Japanese Patent Application No. 2011-275658, filed on Dec. 16, 2011, the entire contents of which are incorporated herein by reference.

BACKGROUND OF THE INVENTION

1. Field of the Invention

The present invention relates to a brake pipe structure of a braking system including ABS (Antilock Brake System) in a vehicle such as a motorcycle.

2. Description of the Related Art

In a conventional motorcycle including a hydraulic brake device, master cylinders of a brake lever provided on a grip of a handlebar or of a brake pedal provided near a step are connected to brake calipers of hydraulic wheel braking parts, for example, hydraulic disk braking devices, provided on front and rear wheels, via various kinds of brake pipes and joint members so that a hydraulic pressure can be transmitted. That is, in the motorcycle, the various kinds of brake pipes are disposed from the front wheel and the rear wheel to the grip of the handle and the brake pedal.

Especially in a motorcycle including an ABS unit, brake pipes and so on connect master cylinders of a brake lever and a brake pedal to the ABS unit and connect brake calipers of front and rear brake devices to the ABS unit, so that the pipe length (the total extension of the brake pipes) becomes long and the layout of the brake pipes is complicated.

The brake pipes thus complicatedly laid out are fixed or held at a plurality of places of the vehicle to a predetermined position by fixing members or holding members so that no slacking, bending, or the like occurs in their middle portions or so that they do not come into contact with other members or the like. Incidentally, Patent Document 1 discloses an example of this kind of brake pipe structure.

[Patent Document 1] Japanese Laid-open Patent Publication No. 2007-076554

However, especially on a front wheel side including front forks supported by a steering shaft to be pivotable left and right and expanding and contracting up and down, a forcible bending load, if acting on the brake pipes due to the left and right swinging and the expansion and contraction of the front forks, hinders self-aligning trying to pivot the front wheel left and right to maintain a vehicle body in a stable state, and in this state, running stability might be impaired.

SUMMARY OF THE INVENTION

In consideration of such circumstances, it is an object of the present invention to provide a brake pipe structure of a motorcycle capable of ensuring good self-aligning and realizing structure simplification and so on.

A brake pipe structure of a motorcycle of the present invention is a brake pipe structure of a motorcycle in which a front fork by which a front wheel is rotatably supported and on whose upper end a handlebar is fixed is supported to be pivotable left and right about a steering shaft, by a head pipe provided at a front end of a body frame, a master cylinder attached to the handlebar and a hydraulic wheel braking part provided on the front wheel are connected via brake pipes, and an ABS unit for antilock braking mounted at a substantially center portion of the body frame is interposed, the brake pipe structure including: a first brake pipe connecting the master cylinder and the ABS unit; and a second brake pipe connecting the ABS unit and the hydraulic wheel braking part, wherein the first brake pipe and the second brake pipe are suspended and held between the front fork and the body frame so as to pass near a center axis of the steering shaft under the head pipe.

Further, in the brake pipe structure of the motorcycle of the present invention, the master cylinder and the hydraulic wheel braking part are disposed on a handle grip part on a vehicle width direction of the one side, and on a front fork below the spring portion on a vehicle width direction of the other side respectively across the steering shaft, and in a vehicle plane view, the first brake pipe and the second brake pipe are arranged so as to intersect in the vehicle width direction near the center axis of the steering shaft.

Further, in the brake pipe structure of the motor cycle of the present invention, the first brake pipe that connects its one end to the master cylinder is arranged above in vehicles side view rather than the second brake pipe that connects its one end to a hydraulic wheel braking part.

Further, in the brake pipe structure of the motorcycle of the present invention, a front half portion of the first brake pipe that hangs down in front of a steering shaft from the master cylinder arranged above of a front fork, the front half portion is held by a front part holding part provided in an under-bracket at least at forward side rather than the steering shaft being pivotable integrally to the front fork;

a rear half portion of the first brake pipe extending rearward in order to pass through the bottom of a under-bracket and to connect with the ABS unit, the rear half portion is held by a rear portion holding part provided in a back position rather than the steering shaft of the head pipe of a body frame; and at least a part of the first brake pipe between the front part holding part and the rear portion holding part is formed by a flexible hose member between a front part holding part and a rear portion holding part.

Further, in the brake pipe structure of the motorcycle of the present invention, the second brake pipe is held at the body frame by a rear portion holding part in which a rear half portion connected with the ABS unit is provided near the head pipe;

and the front half portion joined to the hydraulic pressure wheel braking part is held by a front part holding part at the portion below the springpart of a front fork in which expansion and contraction was formed possible, and at least a part of the second brake pipe between the front part holding part and the rear part holding part is formed by a flexible hose member.

DETAILED DESCRIPTION OF THE PREFERRED EMBODIMENTS

Hereinafter, a suitable embodiment in a brake pipe structure of a motorcycle according to the present invention will be described based on the drawings.

Figure 1:
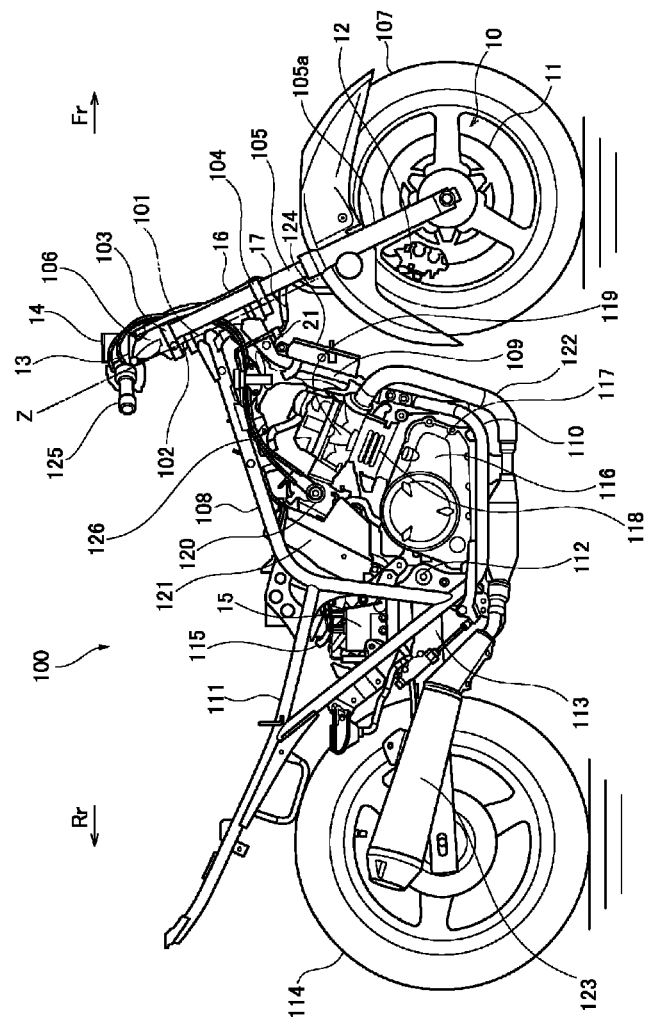
FIG. 1 is a side view showing the whole essential structure of a motorcycle according to the present invention.

FIG. 1 is a side view of the motorcycle according to the present invention. First, the whole structure of the motorcycle will be described by using FIG. 1. Note that in the drawings including FIG. 1 used in the following description, a front direction of the vehicle is represented by an arrow Fr, a rear direction of the vehicle is represented by an an arrow Rr, a lateral right direction of the vehicle is represented by an arrow R, and a lateral left direction of the vehicle is represented by an arrow L when necessary.

In FIG. 1, a state where exterior members and a fuel tank of a motorcycle 100 are removed is shown. A steering head pipe 101 is disposed on a front upper portion of a vehicle body of the motorcycle 100, and a steering shaft 102 is pivotably inserted in the steering head pipe 101. An upper bracket 103 and an under bracket 104 for supporting later-described front forks are coupled to an upper end portion and a lower end portion of the steering shaft 102 respectively, and these upper bracket 103 and under bracket 104 support the pair of left and right front forks 105. A handlebar 106 is bound to an upper portion of the upper bracket 103, and a front wheel 107 being a steering wheel is rotatably supported on lower ends of the front forks 105 so as to be sandwiched therebetween.

An arrangement relation of the front forks 105 and the steering head pipe 101 is such that in a side view, the front forks 105 are displaced appropriately forward from the steering head pipe 101, and in a front view, the steering head pipe 101 is disposed at a middle portion between the front forks 105. Further, the front forks 105 extend obliquely downward in the front direction from the steering head pipe 101 and are set so as to make a predetermined castor angle.

Further, from the steering head pipe 101, a pair of left and right main frames 108 extends while inclining obliquely downward in the vehicle body rear direction, and a down pipe 109 extends downward substantially vertically. The down pipe 109 branches off into left and right lower frames 110 near its lower portion, and the pair of lower frames 110 extends downward and then is bent at a substantially right angle in the vehicle body rear direction to extend rearward. The left and right main frames 108 curve downward at a substantially a front-rear direction center portion of the vehicle body and are coupled to the lower frames 110 respectively. Further, near the downward curving portions of the main frames 108, seat rails 111 extend while inclining obliquely upward in the rear direction, and the lower frames 110 extending from their coupling portions with the main frames 108 obliquely upward in the rear direction are coupled to middle portions of the seat rails 111.

A pivot shaft 112 is provided in a lower portion, of the vehicle body, at a substantially front-rear direction center located near the coupling portions of the main frames 108 and the lower frames 110, and by the pivot shaft 112, a front end portion of a rear swing arm 113 is supported to be swingable up and down. On a rear end portion of the rear swing arm 113, a rear wheel 114 being a driving wheel is rotatably supported.

The rear swing arm 113 is suspended on the vehicle body via a shock absorber 115 (rear wheel suspension).

A water-cooled engine unit 116 being a driving source is mounted in a space surrounded by the pair of left and right main frames 108, the down pipe 109, and the lower frames 110. In this example, the engine unit 116 includes, for example, a four-cycle parallel two-cylinder engine, and the engine includes a crankcase 117 housing a crankshaft and a transmission, which are not shown, a cylinder block 118 coupled to the crankcase 117 and housing a piston, and a cylinder head 119 coupled to the cylinder block 118 and forming a combustion chamber between itself and the piston, and they are coupled to one another in order in a substantially up and down direction while taking an appropriately forward tilting posture.

The fuel tank, not show, is mounted above the engine unit 116 to supply a fuel to a throttle body 120 disposed and connected at the rear of the cylinder head 119. Further, at the rear of the throttle body 120, an air cleaner box 121 is disposed and connected, and the air cleaner box 121 and the cylinder head 119 are connected to each other by an intake passage including the throttle body 120. The throttle body 120 is equipped with a fuel injector, and in the throttle body 120, an air-fuel mixture in which the fuel jetted from the fuel injector and air fed from the air cleaner box 121 are mixed is generated, and this air-fuel mixture is supplied to the cylinder head 119.

Further, an exhaust pipe 122 is connected to an exhaust port formed in the cylinder head 119, and combustion gas produced in the combustion chamber of the engine is let out as exhaust gas from the exhaust pipe 122 via a muffler 123. In this example, since the engine is the water-cooled engine, a radiator 124 is mounted in front of the engine unit 116. The down pipe 109 is used to attach the radiator 124.

In the above-described case, an accelerator grip 125 is attached to a right end portion of the handlebar 106, and a throttle cable 126 is arranged between the accelerator grip 125 and the throttle body 120 to connect the both. That is, by operating the accelerator grip 125, it is possible to control the opening/closing of a throttle valve installed in the throttle body 120, via the throttle cable 126. As shown in FIG. 1, the throttle cable 126 once extends to a front of the upper bracket 103 from the accelerator grip 125 and between the left and right front forks 105, it turns rearward from above the under bracket 104 to be led to the throttle body 120.

Figure 2:
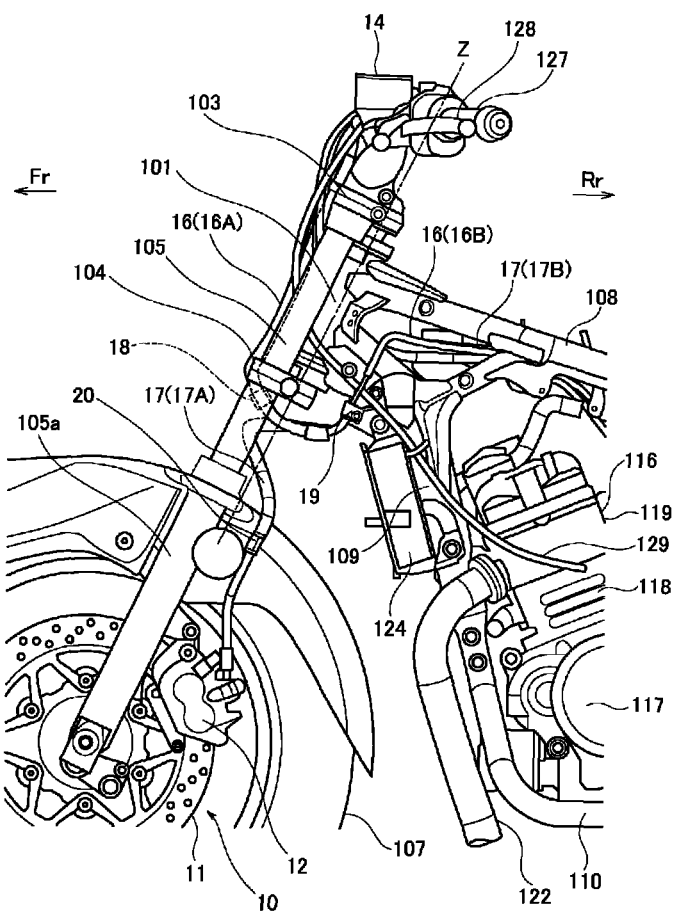
FIG. 2 is a left side view showing a brake pipe structure around front forks in an embodiment of the present invention.

Further, as shown in FIG. 2, a handle grip 127 is attached to a left end portion of the handlebar 106, and a clutch lever 128 is disposed on a front side of the handle grip 127. The clutch lever 128 is connected to a clutch device of the engine unit 116 via a clutch cable 129, and by operating the clutch lever 128, it is possible to control the connection/disconnection of the clutch device. The clutch cable 129 once extends from the clutch lever 128 to the front of the upper bracket 103, and between the left and right front forks 105, turns rearward from above the under bracket 104 to be led to the vicinity of a leftward portion of an upper surface of the crankcase 117.

Further, the motorcycle 100 includes a brake device 10 as its braking device. In this embodiment, the motorcycle 100 includes a hydraulic disk brake device on the front wheel side and a hydraulic disk brake device on the rear wheel side, but here, the hydraulic disk brake device being a hydraulic wheel braking part on the front wheel side will be described. As shown in FIG. 2, a brake disk 11 which rotates coaxially with an axle of the front wheel 107 and integrally with the front wheel 107 is provided on a left side of the front wheel 107, and a brake caliper 12 is engageable with the brake disk 11. Note that the brake caliper 12 is fixed to a spring lower portion 105a of the left front fork 105 (refer to FIG. 2) and operates based on the operation of a brake lever 13 disposed on a front side of the accelerator grip 125.

Figure 3:
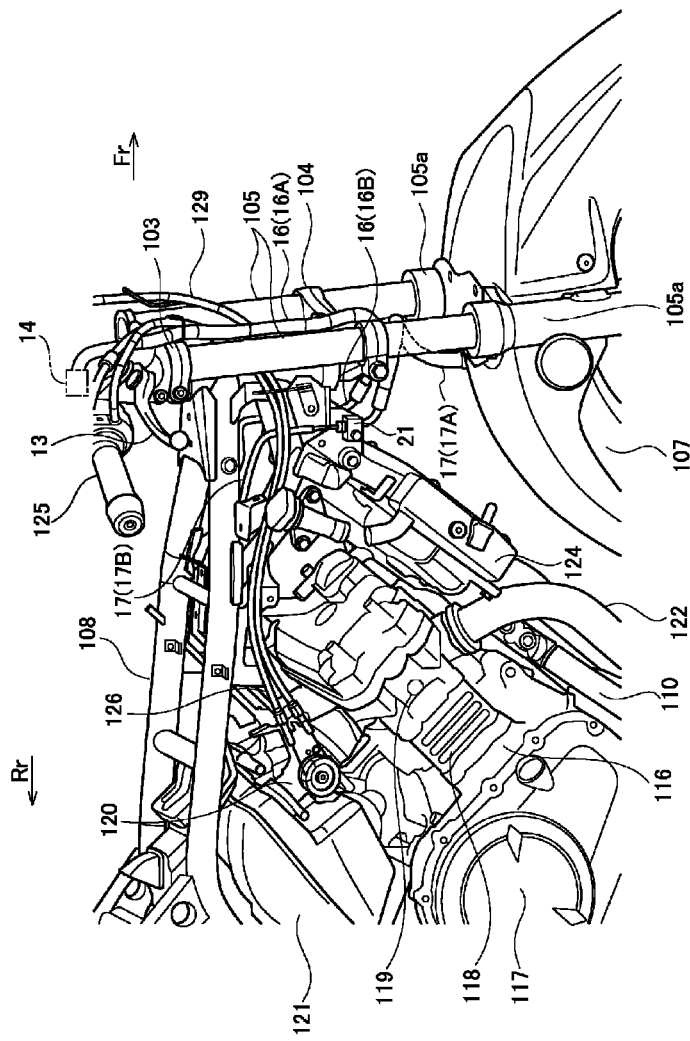
FIG. 3 is a right side view showing the brake pipe structure around the front forks in the embodiment of the present invention.

In the brake device 10, a master cylinder 14 connected to the brake lever 13 is attached to a right side of the handlebar 106, that is, its portion closer to the accelerator grip 125, and the master cylinder 14 and the brake caliper 12 are connected by later-described brake pipes. In this case, an ABS unit 15 for antilock braking is interposed therebetween. As shown in FIG. 1, the ABS unit 15 is mounted on a substantially center portion of a vehicle frame including the main frames 108 and so on. As shown in FIG. 2 and FIG. 3, the master cylinder 14 and the ABS unit 15 are connected by a first brake pipe 16, and the brake caliper 12 and the ABS unit 15 are connected by a second brake pipe 17.

Figure 4:
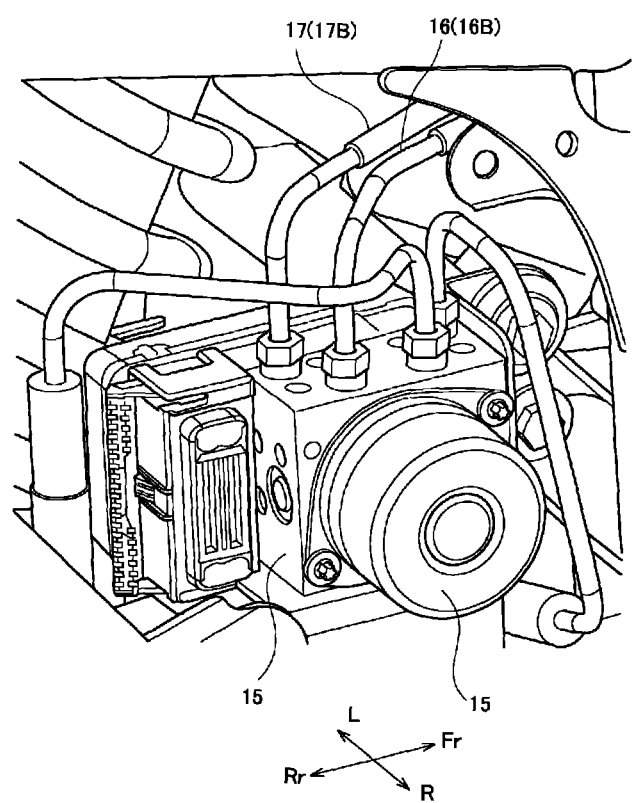
FIG. 4 is a perspective view showing the brake pipe structure around an ABS unit in the embodiment of the present invention.

More concretely, as shown in FIG. 1, FIG. 2, and so on, the first brake pipe 16 and the second brake pipe 17 are suspended and held between the front forks 105 and the vehicle frame so as to pass near a center axis Z of the steering shaft 102 under the steering head pipe 101. The first brake pipe 16 and the second brake pipe 17 thus suspended turn to the rear of the under bracket 104 and extend rearward substantially along the main frames 108 to be connected to the ABS unit 15 as shown in FIG. 4.

As described above, the master cylinder 14 and the hydraulic wheel braking part composed of the brake disk 11 and the brake caliper 12 are disposed across the steering shaft 102, the former being disposed on the handle grip part on the vehicle width direction one side (right side), that is, on the handle grip 125, and the latter being disposed on the spring lower portion 105a of the front fork 105 on the vehicle width direction other side (left side). In this case, as shown in FIG. 5 and FIG. 6, the first brake pipe 16 and the second brake pipe 17 are further arranged so as to intersect in the vehicle width direction near the center axis Z of the steering shaft 102 in a vehicle plane view.

Figure 5:
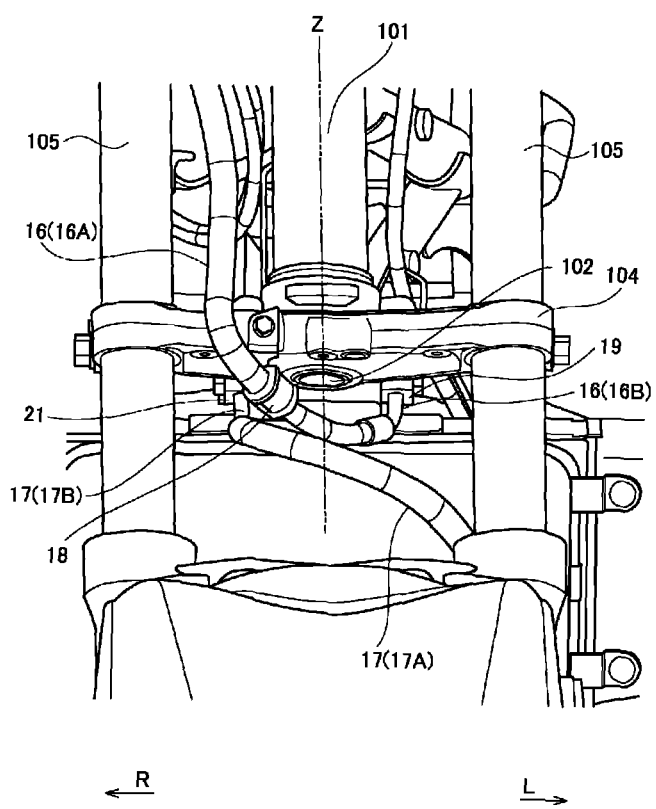
FIG. 5 is a front view showing the brake pipe structure around the front forks in the embodiment of the present invention.
Figure 6:
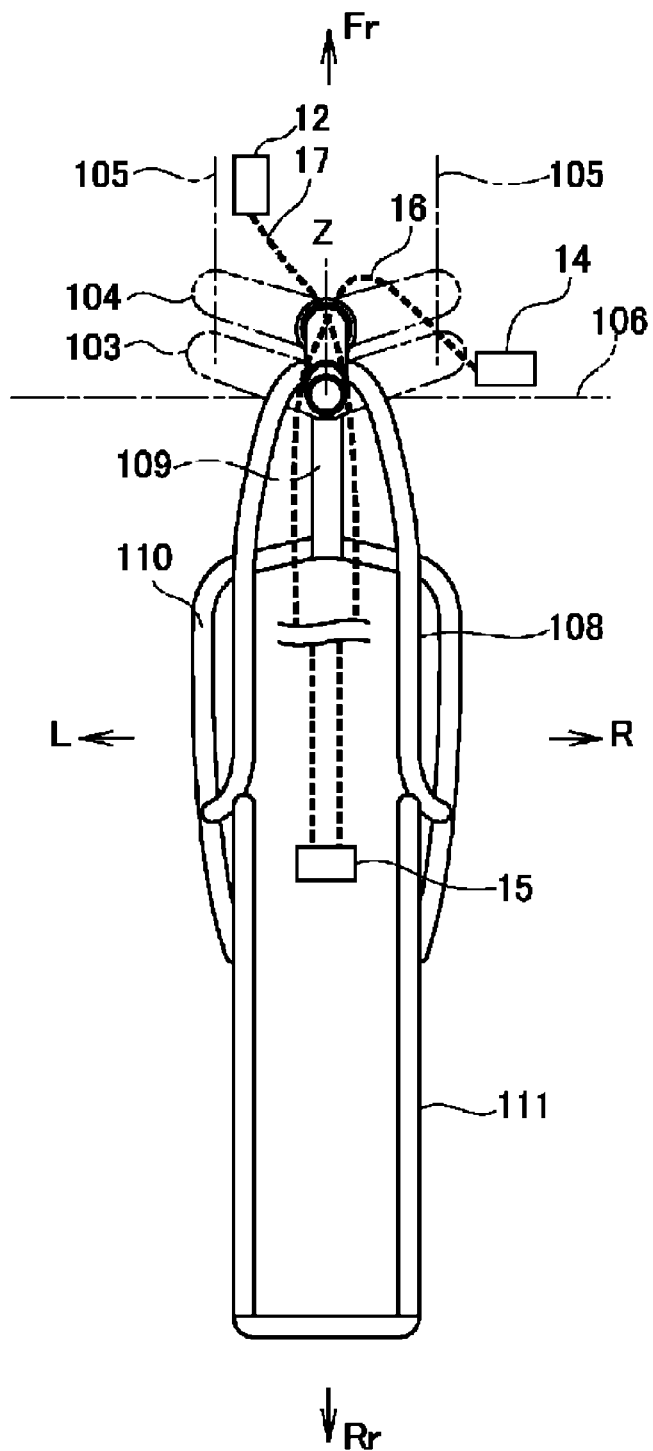
FIG. 6 is a plane view schematically showing the brake pipe structure in the embodiment of the present invention.

Further, as shown in FIG. 5, the first brake pipe 16 whose one end is connected to the master cylinder 14 is disposed above the second brake pipe 17 whose one end is connected to the hydraulic wheel braking part (brake caliper 12).

Here, the first brake pipe 16 is composed of a front half portion 16A and a rear half portion 16B, and the second brake pipe 17 is composed of a front half portion 17A and a rear half portion 17B. In this case, typically, the front half portion 16A and the front half portion 17A are both formed of a flexible synthetic resin pipe or hose, and they have flexibility and certain stiffness. Further, the rear half portion 16B and the rear half portion 17B each are typically formed of a metal pipe.

Further, referring to FIG. 1, FIG. 3, FIG. 5, and so on, in the first brake pipe 16, its front half portion 16A suspended in front of the steering shaft 102 from the master cylinder 14 provided above the front forks 105 is held by a front portion holding part 18 which is provided on the under bracket 104 of the front forks 105 at least at a position more forward than the steering shaft 102, and pivots integrally with the front forks 105. Further, the rear half portion 16B passing under the under bracket 104 and extending rearward to be connected to the ABS unit 15 is held by a rear portion holding part 19 which is provided at a position more rearward than the steering shaft 102 of the steering head pipe 101. In this case, at least a portion, of the first brake pipe 16, between the front portion holding part 18 and the rear portion holding part 19 is formed of a flexible hose member.

Further, in the second brake pipe 17, the front half portion 17A connected to the brake caliper 12 is held by the spring lower portion 105a of the front fork 105 formed to be expandable and contractible, via a front portion holding part 20. Further, the rear half portion 17B, of the second brake pipe 17, connected to the ABS unit 15 is held by the vehicle frame via a rear portion holding part 21 provided near the steering head pipe 101. In this case, at least a portion, of the second brake pipe 17, between the front portion holding part 20 and the rear portion holding part 21 is formed of a flexible hose member.

Figure 7A:
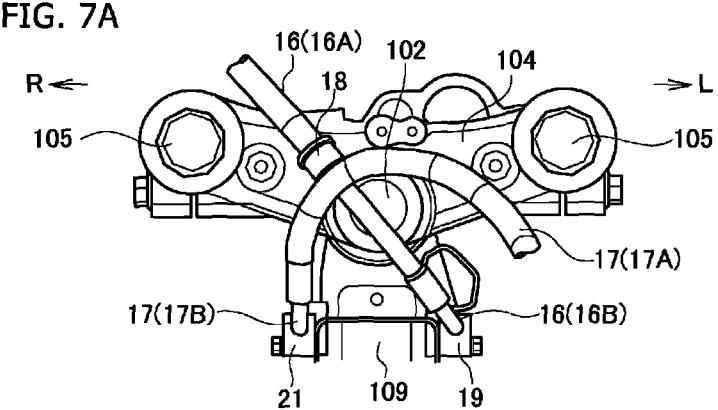
FIG. 7A to FIG. 7C are views each showing an operation during the handle operation, in a bottom view of an under bracket of the front forks in the embodiment of the present invention.
Figure 7B:
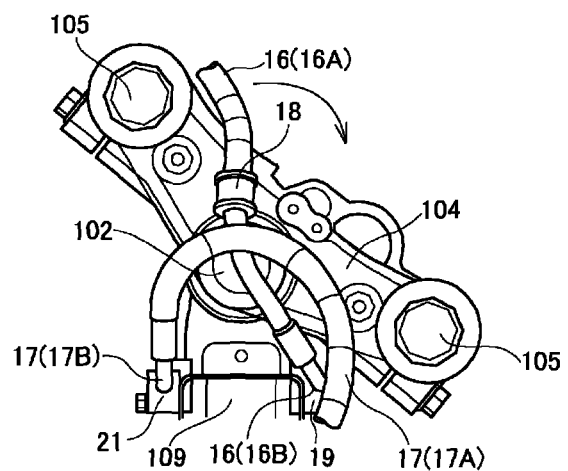
Figure 7C:
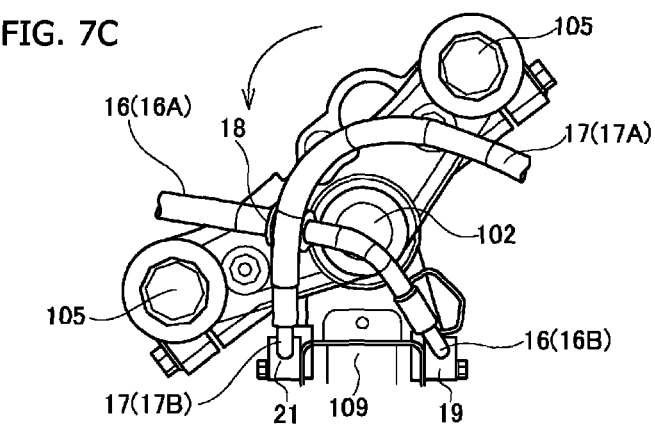

The brake device 10 has the brake pipe structure having the above-described structure, and first, the first brake pipe 16 and the second brake pipe 17 are both suspended between the vehicle frame being a fixed side and the front forks 105 being a movable side, and are held so as to pass near the center axis Z of the steering shaft 102. Here, FIG. 7A to FIG. 7C show states (FIG. 7B, FIG. 7C) where the handle is turned left and right from a state (FIG. 7A) where a handle turning angle is neutral, seen from under the under bracket 104. The first pipe 16 and the second brake pipe 17 are disposed near the handle rotation center as described above, which reduces bending deformation amounts of especially, the front half portion 16A and the front half portion 17A of the first brake pipe 16 and the second brake pipe 17, when the front forks 105 are pivoted left and right. Further, pivoting resistance acting on the steering shaft 102 of the front wheel 107 greatly reduces and the self-aligning trying to maintain the vehicle body in a stable state is not inhibited, resulting in improvement in running stability.

Further, as shown in FIG. 5, FIG. 6, and so on, by arranging the first brake pipe 16 and the second brake pipe 17 so that they mutually intersect, it is possible to make them closer to the center axis Z of the steering shaft 102.

In the above-described case, the first brake pipe 16 undergoes only a deformation in a substantially horizontal direction due to the pivoting about the steering shaft 102 and undergoes no displacement in the up and down direction, while the second brake pipe 17 undergoes both the displacement in the substantially horizontal direction due to the pivoting about the steering shaft 102 and the displacement in the up and down direction due to the expansion and contraction of the front forks 105. The second brake pipe 17 connected to the brake caliper 12 of the hydraulic wheel braking part disposed on the lower portion of the front fork 105 is disposed under the first brake pipe 16 connected to the master cylinder 14 disposed above the front fork 105. Thus setting the vertical arrangement relation of the first brake pipe 16 and the second brake pipe 17 eliminates the interference of the both, which reduces the pivoting resistance acting on the steering shaft 102 due to a forcible deformation.

Further, the front half portion 16A of the first brake pipe 16 is held by the front portion holding part 18 and pivots integrally with the front forks 105. Since a movable range of the first brake pipe 16 is narrow, by shortening a deformable range, it is possible to reduce the whole arrangement length. Further, being fixed and arranged compactly in front of the steering shaft 102, the front half portion 16A is prevented from interfering with members (not shown) such as a head lamp and a speedometer disposed on an upper portion of the front forks 105 around the steering shaft 102.

Further, while the movable range of the first brake pipe 16 is narrow as described above, a movable range of the second brake pipe 17 is wide because it undergoes also the displacement in the up and down direction, but by setting only the spring lower portion 105a side as a portion via which the second brake pipe 17 is held on the front fork 105 to increase the deformable range, it is possible to reduce deformation resistance.

Further, for example, the second brake pipe 17 is structured so as not to be fixed to the under bracket 104, which can reduce the number of parts and simplify the structure. In this case as well, the interference of the first brake pipe 16 and the second brake pipe 17 and their interference with other peripheral components and so on are eliminated, which is greatly advantageous in terms of durability, safety, and the like.

In the foregoing, the present invention is described together with various embodiments, but the present invention is not limited only to these embodiments and changes and the like can be made within the scope of the present invention.

For example, the first brake pipe 16 and the second brake pipe 17 can be structured to have an arrangement relation laterally opposite to the above-described arrangement relation.

According to the present invention, the first brake pipe and the second brake pipe are disposed near the rotation center of the handle, whereby their bending deformation amounts during the handle operation are reduced. Further, the pivoting resistance acting on the steering shaft greatly reduces, and the self-aligning trying to maintain the vehicle body in a stable state improves, resulting in an improvement in running stability.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A brake pipe structure of a motorcycle in which a front fork by which a front wheel is rotatably supported and on whose upper end a handlebar is fixed is supported to be pivotable left and right about a steering shaft, by a head pipe provided at a front end of a body frame, a master cylinder attached to the handlebar and a hydraulic wheel braking part provided on the front wheel are connected via brake pipes, and an ABS unit for antilock braking mounted at a substantially center portion of the body frame is interposed, the brake pipe structure comprising:
    a first brake pipe connecting the master cylinder and the ABS unit; and
    a second brake pipe connecting the ABS unit and the hydraulic wheel braking part,
    wherein the first brake pipe and the second brake pipe are suspended and held by the front fork and the body frame so as to pass under an under-bracket of the front fork pivotably supported by the head pipe,
    wherein the master cylinder and the hydraulic wheel braking part are disposed on a handle grip part on a vehicle width direction of the one side, and on a front fork below the spring lower portion on a vehicle width direction of the other side respectively across the steering shaft, and
    wherein, in a vehicle plane view, the first brake pipe and the second brake pipe are arranged so as to intersect in the vehicle width direction near the center axis of the steering shaft.

2. The brake pipe structure of the motorcycle according to claim 1, wherein
    the first brake pipe that connects its one-end to the master cylinder is arranged above in vehicles side view rather than the second brake pipe that connects its one-end to a hydraulic pressure wheel braking part.

3. The brake pipe structure of the motorcycle according to claim 2, wherein:
    a front half portion of the first brake pipe that hangs down in front of a steering shaft from the master cylinder arranged above of a front fork, said front half portion is held by a front part holding part provided in an under-bracket at least at forward side rather than the steering shaft being pivotable integrally to the front fork;
    a rear half portion of the first brake pipe extending rearward in order to pass through the bottom of a under-bracket and to connect with the ABS unit, said rear half portion is held by a rear portion holding part provided in a back position rather than the steering shaft of the head pipe of a body frame; and
    at least a part of the first brake pipe between the front part holding part and the rear portion holding part is formed by a flexible hose member.

4. The brake pipe structure of the motorcycle according to claim 2, wherein:
    the second brake pipe is held at the body frame by a rear portion holding part in which a rear half portion connected with the ABS unit is provided near the head pipe;
    a front half portion which connects the second brake pipe to the wheel braking part of liquid pressure is held by a front part holding part provided in the portion below the spring of a front fork; and
    at least a part of the second brake pipe between the front part holding part and the rear part holding part is formed by a flexible hose member.

* * * * *